United States Patent [19]

Hurst, Jr. et al.

[11] Patent Number: 4,553,157
[45] Date of Patent: Nov. 12, 1985

[54] APPARATUS FOR CORRECTING ERRORS IN COLOR SIGNAL TRANSITIONS

[75] Inventors: Robert N. Hurst, Jr., Hopewell Borough; Robert A. Dischert, Burlington Township, Burlington County, both of N.J.

[73] Assignee: RCA Corporation, Princeton, N.J.

[21] Appl. No.: 558,373

[22] Filed: Dec. 5, 1983

[51] Int. Cl.⁴ .......................................... H04N 9/535
[52] U.S. Cl. ...................................... 358/27; 358/37
[58] Field of Search ............... 358/21 R, 27, 28, 36, 358/37, 40

[56] References Cited

U.S. PATENT DOCUMENTS

| | | | |
|---|---|---|---|
| 3,778,543 | 12/1973 | Lowry | 178/5.4 R |
| 3,835,243 | 9/1974 | Nagaoka | 178/5.4 R |
| 4,030,121 | 6/1977 | Faroudja | 358/37 |
| 4,181,917 | 1/1980 | Richman | 358/36 |
| 4,223,342 | 9/1980 | Tsuchiya et al. | 358/37 |
| 4,245,239 | 1/1981 | Richman | 358/37 |
| 4,296,433 | 10/1981 | Rzeszewski | 358/37 |
| 4,355,326 | 10/1982 | Lee | 358/37 |

Primary Examiner—Michael A. Masinick
Attorney, Agent, or Firm—E. M. Whitacre; P. J. Rasmussen; K. N. Nigon

[57] ABSTRACT

An apparatus for correcting errors in color signal transitions includes a signal scaling device and a signal mixing device. A wide bandwidth luminance signal is applied to the signal scaling device which develops a limiting signal for a particular narrow bandwidth color difference or primary color signal. This limiting signal is mixed with its associated color difference or primary color signal by the signal mixing device. The output of the signal mixing device is a color difference or primary color signal that has amplitude values less than or equal to the amplitude values of the limit signal.

14 Claims, 15 Drawing Figures

APPARATUS FOR CORRECTING ERRORS IN COLOR SIGNAL TRANSITIONS

The present invention relates generally to color television signal processing apparatus and specifically to apparatus for processing color television signals to improve the quality of reproduced color images.

All standard color television systems (viz., NTSC, PAL, and SECAM) broadcast a composite video signal containing a wide bandwidth luminance component and one or more narrow bandwidth chrominance components. When this composite signal is processed by a color television receiver, the narrow bandwidth chrominance signal components are used to derive narrow bandwidth color-difference signals which are then combined with the wide bandwidth luminance signal component to produce red, green and blue primary color signals. The primary color signals, having both wide bandwidth and narrow bandwidth components, are used to produce a color image.

If the image to be reproduced contains regions of significant color saturation and vertical edges, however, the image that is actually reproduced by the above-described process may be flawed. The flaws occur because amplitude transitions of the narrow bandwidth color difference signals take longer to occur than their associated wide bandwidth luminance signal transitions. Illustratively, for a transition from saturated red to black, an NTSC luminance signal with a 4.0 MHz bandwidth can have a complete transition to black in 250 ns while the same transition in the red color difference signal, with its 0.5 MHz bandwidth, takes 2 $\mu$s. This difference in transition time causes vertical edges to become blurred and colors to smear horizontally from regions of significant saturation.

Previous attempts to correct this problem have been directed to eliminating the difference in bandwidth by reconstructing a wide bandwidth color-difference or primary color signal. See U.S. Pat. Nos. 4,181,917, 4,245,239 both to Richman; 4,030,121 to Faroudja; 4,223,342 to Tsuchiya; 4,296,433 to Rzeszewski; and 4,355,426 to Lee. First, a signal derived from the wide bandwidth luminance signal is checked for correlation with each of the color difference or primary color signals. The methods of determining correlation vary from simple ratios of the two signals to complex functions of the signals' derivatives. Based on the strength of the correlation, a wide bandwidth signal—derived from the luminance signal—is added in varying proportion to each of the color signals (i.e., color-difference or primary color signals). The goal in each of these inventions is to infer the lost color signal high frequency component from the luminance signal and, by adding this inferred component to the narrow bandwidth color signal, to regenerate a wide bandwidth color signal.

This method of signal processing cannot be used effectively, however, until three problem areas have been addressed: first, the correlation function should not produce erroneous results for any combination of color signal and luminance signal, this problem area being especially troublesome for derivative based correlation circuits dealing with a set of signals having a low signal-to-noise ratio; second, the derived luminance signals should be appropriately scaled so that a proper signal is available for correlation and so that a high frequency component that is neither too large nor too small is added to the color signal; and third, the derived luminance signals should be synchronized, one to the color signal used in the correlation function, and the other to the color signal to which it will be added. Most of the inventions in the prior art have required a complicated apparatus to effectively solve these problems.

The present invention avoids these problems through a different approach to correcting the flaws. Instead of attempting to regenerate wide bandwidth color signals, the present invention simply recognizes and eliminates certain erroneous color signal values. Several wide bandwidth limiting signals are derived from the luminance signal for each color signal that is to be corrected. Each of these limiting signals represents a constraint on its associated color signal. The instantaneous values of these limiting signals are compared to the instantaneous value of their associated color signal by the apparatus disclosed in this invention. If the value of the color signal is found to be greater than a maximum limiting value or less than a minimum limiting value, that limiting value is substituted for the erroneous color signal value.

In a desirable implementation, this invention is applied to at least one complete set of signals containing color hue and color saturation information (e.g., I and Q; R-Y and B-Y; Red, Green and Blue). Ideally, at the color signal processing points where the invention is applied, the relationships between each of the color signals and the luminance signal is linear and fixed, as this relationship is used to set the limits for the color signals. Illustratively, the relationship defined by the luminance equation (y=0.3R+0.59G+0.11B), when taken together with the peak amplitude values of the luminance signal and each primary color signal, would be sufficient to define a set of limiting signals for each primary color signal.

As an example of how these limiting values are used, consider a saturated-red to black transition. When this transition occurs, the luminance signal changes relatively quickly between its value for a red image and its value for a black image while the red primary color signal changes more slowly. For a period of time after the luminance transition is complete, therefore, the luminance signal has a value indicative of no color while the red primary color signal is still changing—an obvious error that results in a displayed color smear. This invention acts to eliminate this type of error. The red primary color signal is compared to a scaled luminance signal representing the maximum value that a red signal could have for each luminance value. Whenever the red primary color signal exceeds this maximum signal, it is corrected by having the maximum signal substituted for all of these erroneous values. As a result, the red primary color signal changes more quickly from saturated red to black and the color smear caused by these errors does not appear in the reproduced image.

As the described method of correcting erroneous color signals does not involve deriving correlation functions or inferring signals to be added to other signals, the apparatus that corrects the signal can have a relatively simple implementation for both analog and digital applications.

Furthermore, since the described method does not entail the use of derivative-based correlation circuits, it does not enhance noise in the video signal. Moreover, it can make the image reproduced for a noisy color signal less objectionable by lowering the intensity of spurious color spots.

For simplicity, the discussion above was limited to the application of the invention to one set of color signals that contain hue and saturation information. It should be realized, however, that further benefit can be obtained by additional cascaded processing. For example, if the R-Y and B-Y color difference signals were corrected by apparatus according to this invention, additional correction could be obtained by applying the invention to the G-Y color difference signal derived from the corrected R-Y and B-Y signals.

In its most basic form, an apparatus for correcting errors in color signal transitions in accordance with the present invention includes a signal scaler and a signal mixer. Wide bandwidth luminance signals are applied to the input of the signal scaler and a wide bandwidth limiting signal for a particular corlor signal appears at its output. The signal mixer accepts this limiting signal and its associated color signal as its two inputs and provides an output signal that has amplitude values substantially equal to the lesser of the amplitude values of its input signals at each point in time. This output signal is a partially corrected color signal.

As an aid to describing exemplary embodiments of the present invention, the following assumptions are made about the steady state amplitude vaues of the luminance, primary color, and color difference signals: first that the luminance signal and the primary color signals may vary between a minimum amplitude value of zero and a maximum amplitude value of 1 and second, that the luminance equation, $Y=0.3R+0.59G+0.11B$, defines how the various primary color signals (R, G and B) mix to generate the luminance signal (Y).

Figure 2A:
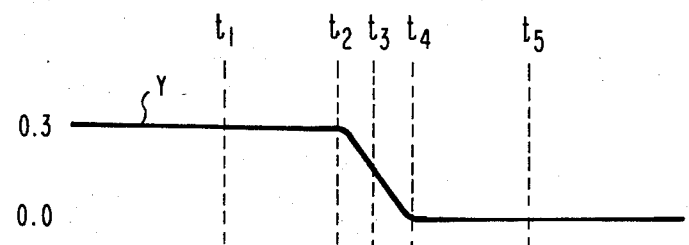
FIGS. 2A, 2B and 2C are graphical depictions of several signals that are useful in explaining the operation of the embodiment in FIG. 1.
Figure 2B:
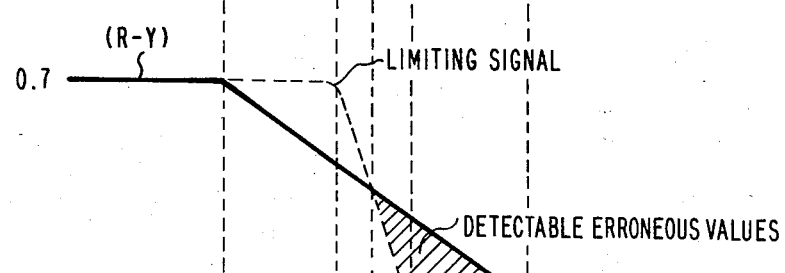

The signals shown in FIGS. 2A and 2B are illustrative of the luminance signal and the R-Y color difference signal that are produced by an NTSC color television receiver for a relatively sharp saturated red to black transition. The luminance signal, shown in FIG. 2A, initially has an amplitude value of 0.3. Its transition starts at time $T_2$ and continues until time $T_4$ when the signal has an amplitude value of approximately 0.0. The time for the luminance transition ($T_4$-$T_2$) is 250 ns. The R-Y color difference signal, however, starts to fall from an initial amplitude value of 0.7 at time $T_1$ to a final value of 0.0 at time $T_5$. The time for this transition ($T_5$-$T_1$) is 2 $\mu$S. These transition times are the times for the signals to go from 90% to 10% of their maximum amplitudes.

The erroneous signal values corrected by this invention are the color difference amplitude values between times $T_3$ and $T_5$. The errors that occur during this time interval are visible on the reproduced image as a smear across the vertical edge from the red region to the black. These errors are easily detected since the amplitude values of the narrow bandwidth R-Y color difference signal are larger than the maximum values that could occur if the R-Y color difference signal had the sand bandwidth as the luminance signal. The dashed line in FIG. 1B labeled "LIMITING SIGNAL" helps to illustrate how these errors are detected and corrected. It has amplitude values consistent with the analogous transition of an R-Y color difference signal with the same bandwidth as the luminance signal in FIG. 2A. The amplitude values in the shaded area between the dashed limiting signal and the solid R-Y color difference signal are greater than the corresponding values of the limiting signal and are reduced to the values of the limiting signal by the present invention in order to correct the smear across the vertical edge.

The limiting signal that is used to correct the erroneous R-Y color difference values is derived from the luminance signal according to the relationship defined by the luminance equation. As used here, the limiting signal is the luminance signal scaled up by a factor of 7/3. The equation that describes the limiting signal in terms of the luminance signal is: $(R-Y)_{L1}=(7/3)Y$. This equation defines a limiting signal equal to the maximum value that an R-Y color difference signal may have for a given luminance signal. Thus, the equation is derived from the luminance equation with the G and B terms set to zero: $Y=0.3R$.

Figure 1:
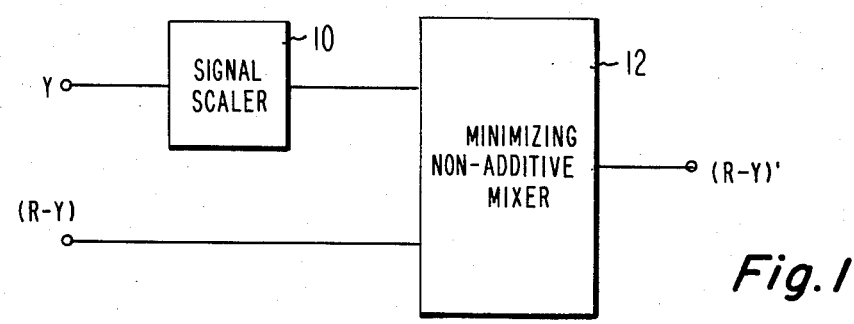
FIG. 1 shows an embodiment of a simple signal correcting apparatus in accordance with the present invention.
Figure 2C:
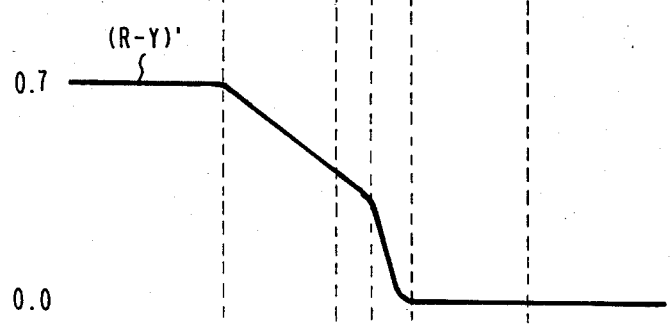

An illustrative embodiment of the invention that comprises this one correcting apparatus is shown in FIG. 1. The apparatus has two input terminals, Y and (R-Y). In the context of an NTSC color television receiver, a wide bandwidth luminance signal from the receiver's luminance signal processing circuits is applied to input terminal Y of signal scaler 10 and an R-Y signal from the receiver's chrominance processing circuits is applied to input terminal (R-Y) of minimizing non-additive mixer 12. The signal scaler 10 increases the amplitude of the luminance signal by a factor of 7/3 to form a limiting signal and provides this signal through its output to one input of mixer 12. The other input of mixer 12 is the R-Y color difference signal. Mixer 12 compares the instantaneous values of these two signals and generates an output signal at terminal (R-Y)'. This output signal is an R-Y color difference signal that has its amplitude values limited by a maximum signal. If the luminance signal in FIG. 2A were applied to terminal Y and the R-Y color difference signal in FIG. 2B were applied to terminal (R-Y), for example, the signal shown in FIG. 2C would appear at terminal (R-Y)'.

Figure 3:
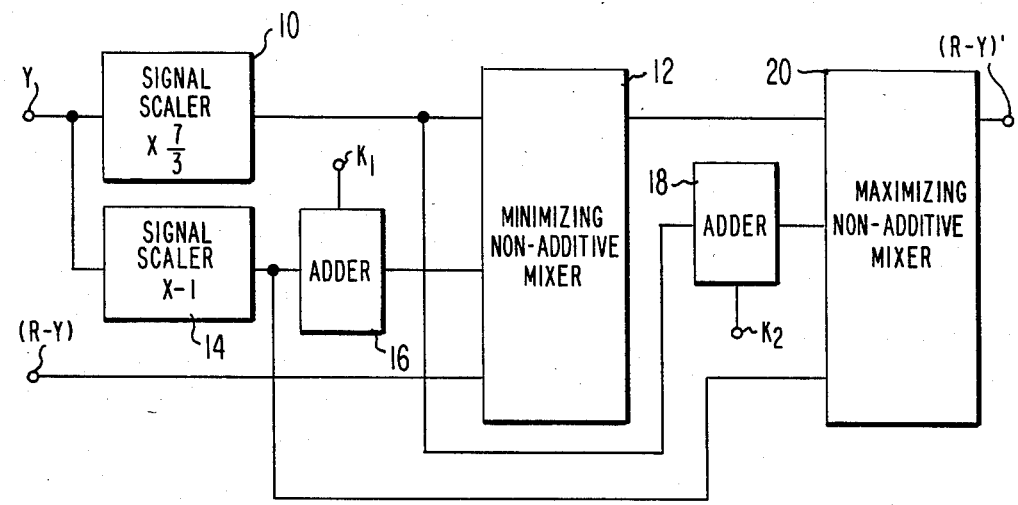
FIG. 3 shows an enhancement of the embodiment in FIG. 1 that more fully corrects an R-Y color difference signal.

Eliminating excursions of the R-Y color difference signal above this one maximum signal corrects only one set of errors. A full application of this invention corrects signal errors for three other types of trnasitions as well. The equations for the four limiting signals are shown in FIG. 3 plotted as functions of luminance.

Line segment AB represents the constraints on the R-Y color difference signal where the blue and green components of the luminance equation are zero. This equation, $(R-Y)_{L1}=(7/3)Y$, was derived above. An example of a signal transition that is corrected by applying this limiting signal is a change fronm saturated red to black.

Line segment BC represents the maximum constraint that flows from the assumed limits on Y and R-Y. The amplitude values of this limiting signal are the amplitude values of the R-Y color difference signal when R is at its maximum value, 1. The equation that describes this line, therefore, is: $(R-Y)_{L2}=1-Y$. The smear into the white region on a vertical saturated red to white transition is removed by limiting the R:Y color difference signal to the amplitude values of this signal.

Line segment CD represents the minimum limiting signal that results from the luminance equation. For this line, the blue and green components of the luminance equation are at their maximum values, so the luminance equation becomes: $Y=0.3R+0.7$. This equation in the form $(R-Y)_{L3}=(7/3)Y-7/3$ describes line segment CD. An example of a transition that is corrected by application of this equation is a change from saturated cyan to white.

Figure 4:
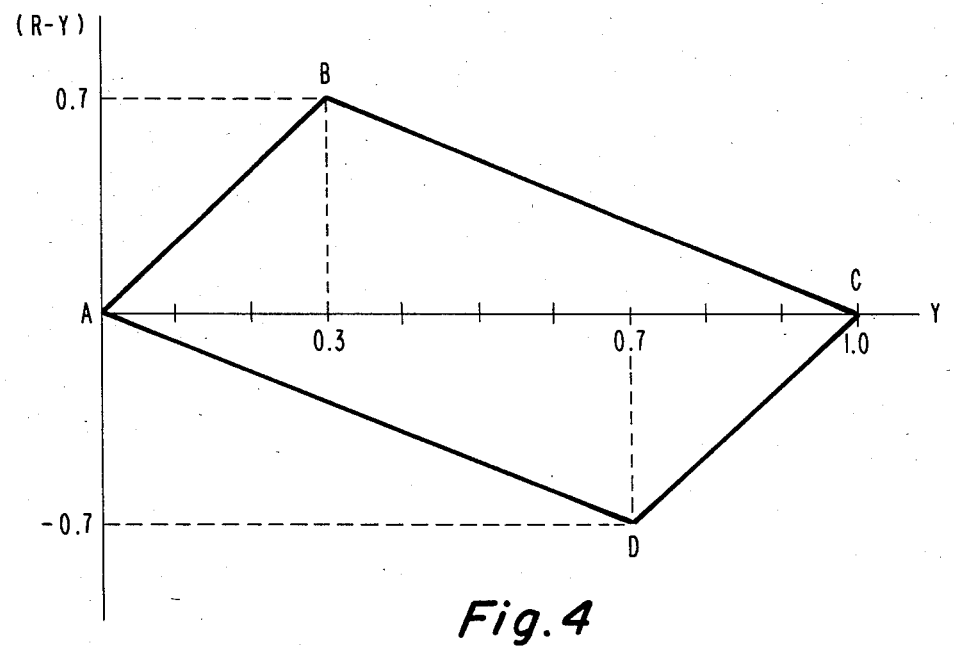
FIG. 4 is a graphical representation of equations useful in explaining the embodiment in FIG. 3.

The final line segment, AD, describes the minimum limiting signal that results from the assumed limits on Y and R-Y. This signal is the R-Y color difference signal when R is at its minimum value, 0. This equation, therefore, is $(R-Y)_{L4}=-Y$. By applying this limit on the R-Y color difference signal, a transition, for example, from saturated green to black is corrected. As can be seen in FIG. 4, when these lines are plotted together they form a parallelogram, lines AB and DC both have a slope of 7/3 while lines BC and AD both have a slope of −1. The area inside the parallelogram represents all valid combinations of R-Y and Y, the area outside the parallelogram represents the invalid combinations.

An illustrative embodiment of the invention that implements the restrictions represented by this parallelogram is shown in FIG. 3 as an extension of the embodiment shown in FIG. 1. Luminance signals are applied to terminal Y which provides the input signals to signal scalers 10 and 14. The output of signal scaler 10 is a luminance signal that has been scaled up by a factor of 7/3. It provides one input signal to adder 18 and the first limiting input signal to minimizing non-additive mixer 12. The output of signal scaler 14 provides an inverted luminance signal to one input of adder 16 and to one input of maximixing non-additive mixer 20. The second input to adder 16, at terminal $K_1$, is a constant signal from, from example, a source of reference potential having a value of +1 amplitude unit. Adder 16 adds this constant signal to the inverted luminance signal from the output of signal scaler 14 to form an output signal that serves as the second limiting input signal to mixer 12. The third input to mixer 12 is the red color difference signal applied to mixer 12 input terminal (R-Y). The output of mixer 12 is a partially corrected R-Y color difference signal; its amplitude values will not exceed the maximum amplitude values of the two limiting input signals. The output of mixer 12 provides the first input to mixer 20. The second input to mixer 20 is a limiting signal, the sum of the two input signals applied to adder 18. One of these input signals is the output signal of signal scaler 10 and the other is the signal applied to terminal $K_2$ of adder 18. The input at $K_2$ is a constant signal from, for example, a source of reference potential, having a value of −7/3 amplitude units. The second limiting signal input to mixer 20 is the output of signal scaler 14. Mixer 20 provides an output signal that is substantially equal to the largest of the amplitude values of its input signals at each point in time. This output signal is a corrected R-Y color difference signal.

Limiting signals for the other two color difference signals, G-Y and B-Y, can be derived and applied in the same manner as was used above for the R-Y limiting signals. The equations that describe the G-Y and B-Y limiting signals are shown in Table 1.

TABLE 1

| | |
|---|---|
| $(G-Y)_{L1} = (41/59)Y$ | $(B-Y)_{L1} = (89/11)Y$ |
| $(G-Y)_{L2} = 1 - Y$ | $(B-Y)_{L2} = 1 - Y$ |
| $(G-Y)_{L3} = (41/59)Y - 41/59$ | $(B-Y)_{L3} = (89/11)Y - 89/11$ |
| $(G-Y)_{L4} = -Y$ | $(B-Y)_{L4} = -Y$ |

Figure 7:
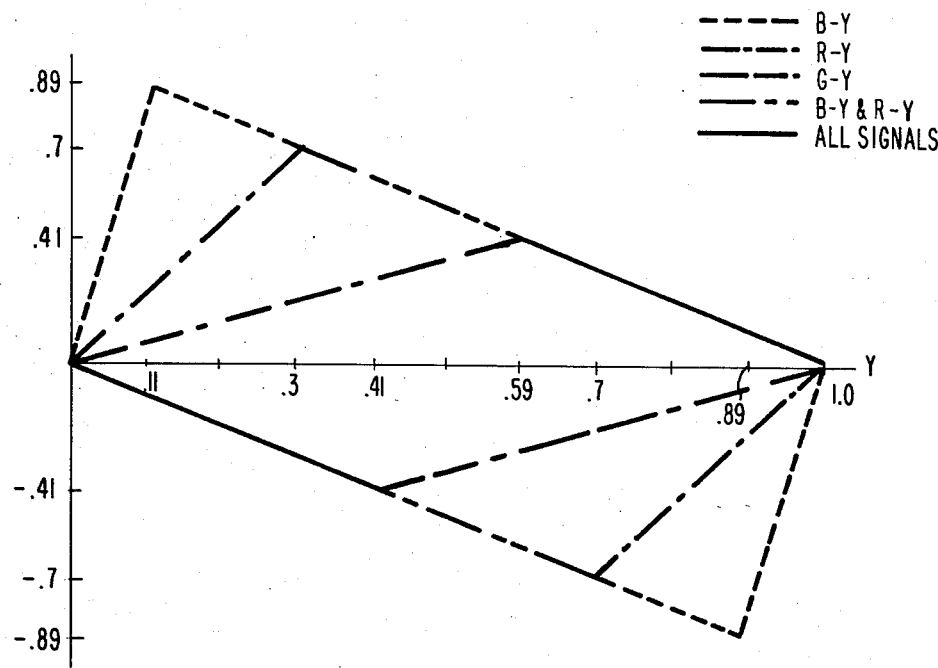
FIG. 7 is a graphical representation of equations useful in explaining the embodiment in FIG. 5.

These equations and the equations for R:Y are plotted as a function of luminance in FIG. 7. It is seen from this figure that the limiting signals which flow from the assumed limits on the maximum and minimum values of the color difference and luminance signals are the same for all three color difference signals: $(X-Y)_{L2}=1-Y$ and $(X-Y)_{L4}=-Y$. These identities can be exploited in an embodiment that corrects the three color difference signals, R-Y, B-Y and G-Y; two of the four limiting signals of each correcting apparatus need be derived only once.

Figure 5:
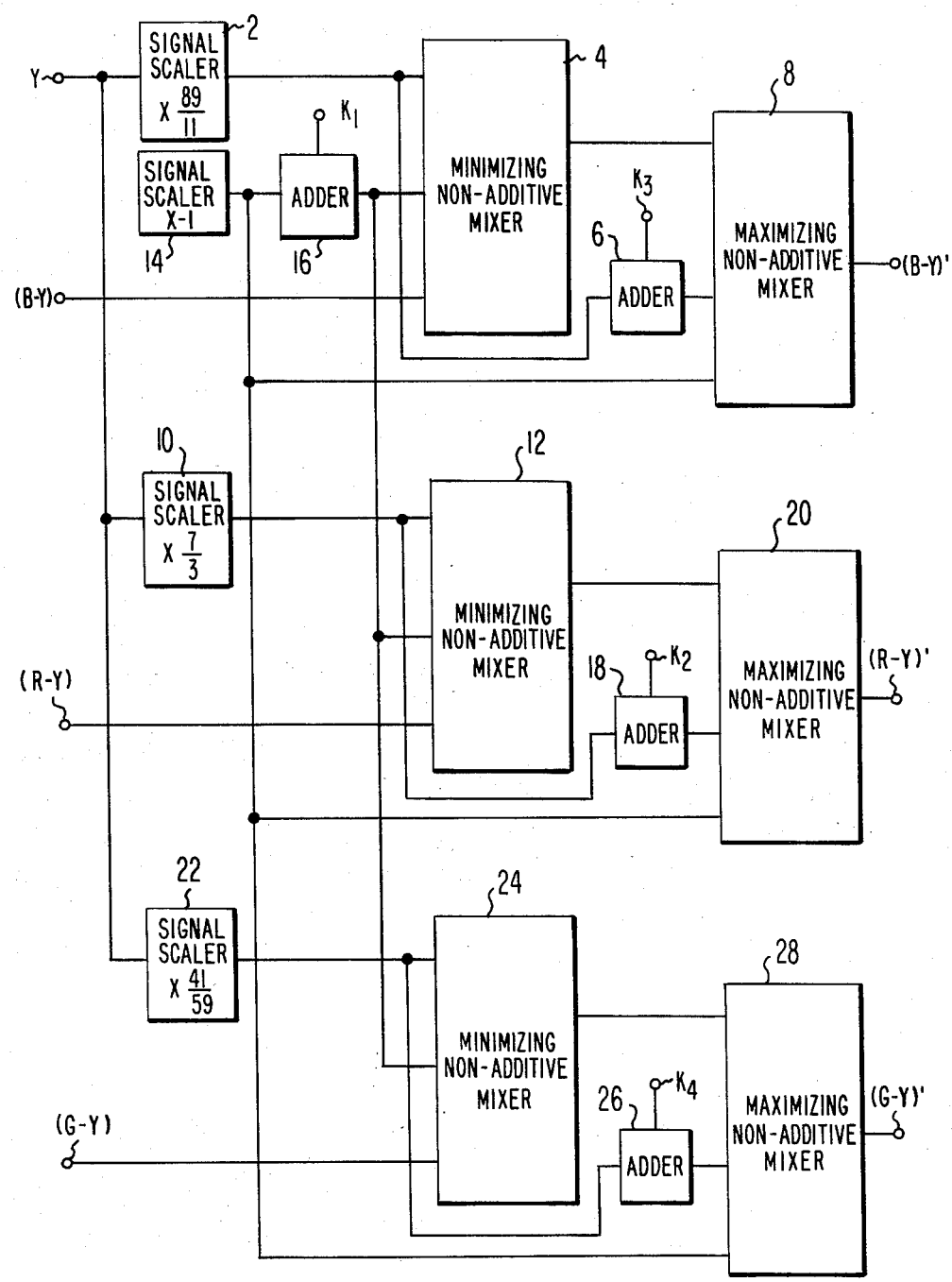
FIG. 5 shows an enhancement of the embodiment in FIG. 3 that corrects the three color difference signals, B-Y, R-Y and G-Y.

FIG. 5 shows an illustrative embodiment that corrects the three color difference signals as an extension of the embodiments shown in FIGS. 1 and 3. A luminance signal is applied to terminal Y which serves as the input terminal to signal scalers 2, 10, 14, and 22. Signal scaler 2 increases this input luminance signal by a factor of 89/11 to generate the first limiting signal of the B-Y color difference signal correcting apparatus. The output of signal scaler 2 is connected to minimizing non-additive mixer 4, providing it with a first limiting input signal, and to one input of adder 6. Signal scaler 14 inverts the luminance signal applied to its input to provide a limiting input signal for each of the maximizing non-additive mixers 8, 20, and 28; it also supplies one input signal to adder 16. The other input to adder 16 is through its input terminal $K_1$. A constant signal with a value of +1 amplitude unit from, for example, a source of reference potential, is applied to this input terminal. Adder 16 forms the sum of this constant signal and the inverted luminance signal from the output of signal scaler 14 to provide the second limiting signal applied to mixer 4. This limiting signal is also applied to minimizing non-additive mixers 12 and 24. The last input to mixer 4 is a B-Y color difference signal applied to mixer input terminal (B-Y). Mixer 4 combines the signals at its inputs to form an output signal that, at each point in time, has an amplitude value substantially equal to the least of the amplitude values of its input signals. This output signal is a corrected B-Y color difference signal, limited to be at or below the maximum vaues that would be consistent with the coincident wide bandwidth luminance signal. The output of mixer 4 provides one input to mixer 8. The other two inputs, the limiting signals, are the inverted luminance signal from the output of signal scaler 14 and the signal from the output of adder 6. The two inputs to adder 6 are the scaled luminance signal from signal scaler 2 and a constant signal from, for example, a source of reference potential with a value of −89/11 amplitude units applied to the $K_3$ input terminal of adder 6. The signal produced by mixer 8 appears at mixer output terminal (B-Y)'. This signal is a corrected B-Y color difference signal; its amplitude values are neither above the maximum nor below the minimum values allowed by the aforementioned luminance equation and the coincident luminance signal.

The other two color difference signal correcting apparatus are similar to the apparatus just described. Signal scaler 10, which receives its luminance input signal from terminal Y, generates an output signal substantially equal to the luminance signal increased by a factor of 7/3. The output of signal scaler 10 provides a limiting signal input to mixer 12 and an input to adder 18. The other limiting input to mixer 12 is the inverted luminance signal increased by a term of +1 amplitude unit from the output of adder 16, The last input to mixer 12 is the R-Y color difference signal applied to the (R-Y) input terminal of mixer 12. The output of mixer 12 is an R-Y color difference signal that is corrected to be at or below the amplitude values of the maximum signals. This corrected signal is applied as an input to mixer 20. The two limiting inputs to mixer 20 are the inverted luminance signal from the output of signal scaler 14 and the output signal from adder 18. The signal generated by adder 18 is the sum of the scaled luminance signal from signal scaler 10 and a constant signal equal to $-7/3$ amplitude units from input terminal $K_2$ of adder 18. The output of mixer 20 is an R-Y color difference signal corrected in accordance with the principles of the present invention.

Signal scaler 22 also receives its input signal from terminal Y. Its output signal, however, is a luminance signal that has been scaled down by a factor of 41/59. This output signal is applied as a limiting input signal to mixer 24 and as an input to adder 26. The second limiting input signal to mixer 24 comes from the output of adder 16. The last input to mixer 24 is a G-Y color difference signal from the mixer's input terminal (G-Y). The output of mixer 24 is passed as an input to mixer 28 for further correction. The two limiting signal inputs to mixer 28 are the inverted luminance signal from the output of signal scaler 14 and the signal produced by adder 26. This signal is the sum of the scaled luminance signal from the output of signal scaler 22 and a constant signal equal to $-41/59$ amplitude units from input terminal $K_4$ of adder 26. The signal produced at output terminal (G-Y)' of mixer 28 is a corrected G-Y color difference signal.

Figure 8:
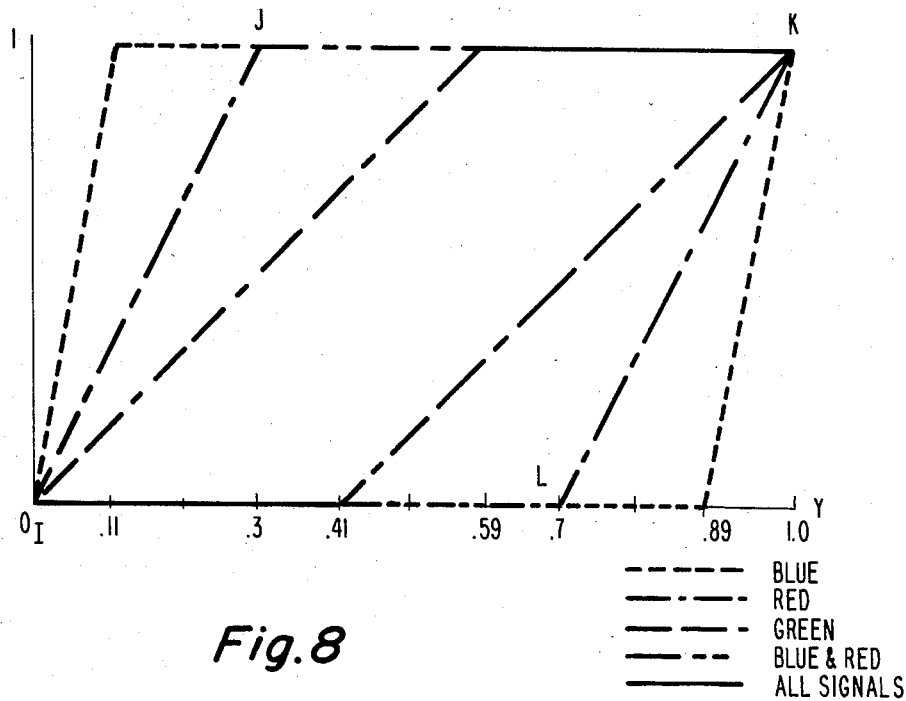
FIG. 8 is a graphical representation of equations useful in explaining the embodiment of FIG. 6.

The same type of analysis used to develop this color difference signal correcting apparatus can be used to develop a primary color signal correcting apparatus. FIG. 8 shows the equations for the primary color limiting signals plotted as a function of luminance. The equations for the red primary color limiting signals are derived as an illustration of how the green and blue limiting signals would be determined.

The equation for line IJ defines the limiting maximum signal derived from the luminance equation. This equation is the luminance equation with the green and blue components equal to zero; all luminance comes from the red component. Under this restraint. The luminance equation becomes $Y=0.3R$, and so this limit equation is: $R_{L1}=(10/3)Y$. An example of a transition that is corrected by applying this equation is a change from saturated red to black.

The equation for line JK is simply the aforementioned assumption that the red primary color signal cannot have an amplitude value greater than 1: $R_{L2}=1$. Application of this equation to the red primary color signal corrects, for example, transitions between saturated red and white.

The limiting minimum signal that is derived from the luminance equation is defined by line KL. This limiting signal corresponds to the luminance equation with both the blue and green terms at their maximum values, 1. Any luminance in excess of what can be provided by the blue and green components must come from the red component. The luminance equation, thus restricted, becomes: $Y=0.3R+0.7$, and so, this limit equation is: $R_{L3}=(10/3)Y-7/3$. An example of a transition that is corrected by applying this equation is a change from saturated cyan to white.

The last line segment, IL, is simply the constraint that the red primary color signal cannot have an amplitude value less than 0. The limit equation for this line is, therefore, $R_{L4}=0$. Application of the limiting signal derived from this equation corrects errors in a saturated cyan to black transitions. The equations for the other two primary colors can be derived by similar analysis. They are given in Table 2.

TABLE 2

| | |
|---|---|
| $B_{L1} = (100/11)Y$ | $G_{L1} = (100/59)Y$ |
| $B_{L2} = 1$ | $G_{L2} = 1$ |
| $B_{L3} = (100/11)Y - 89/11$ | $G_{L3} = (100/59)Y - 41/59$ |
| $B_{L4} = 0$ | $G_{L4} = 0$ |

Figure 6:
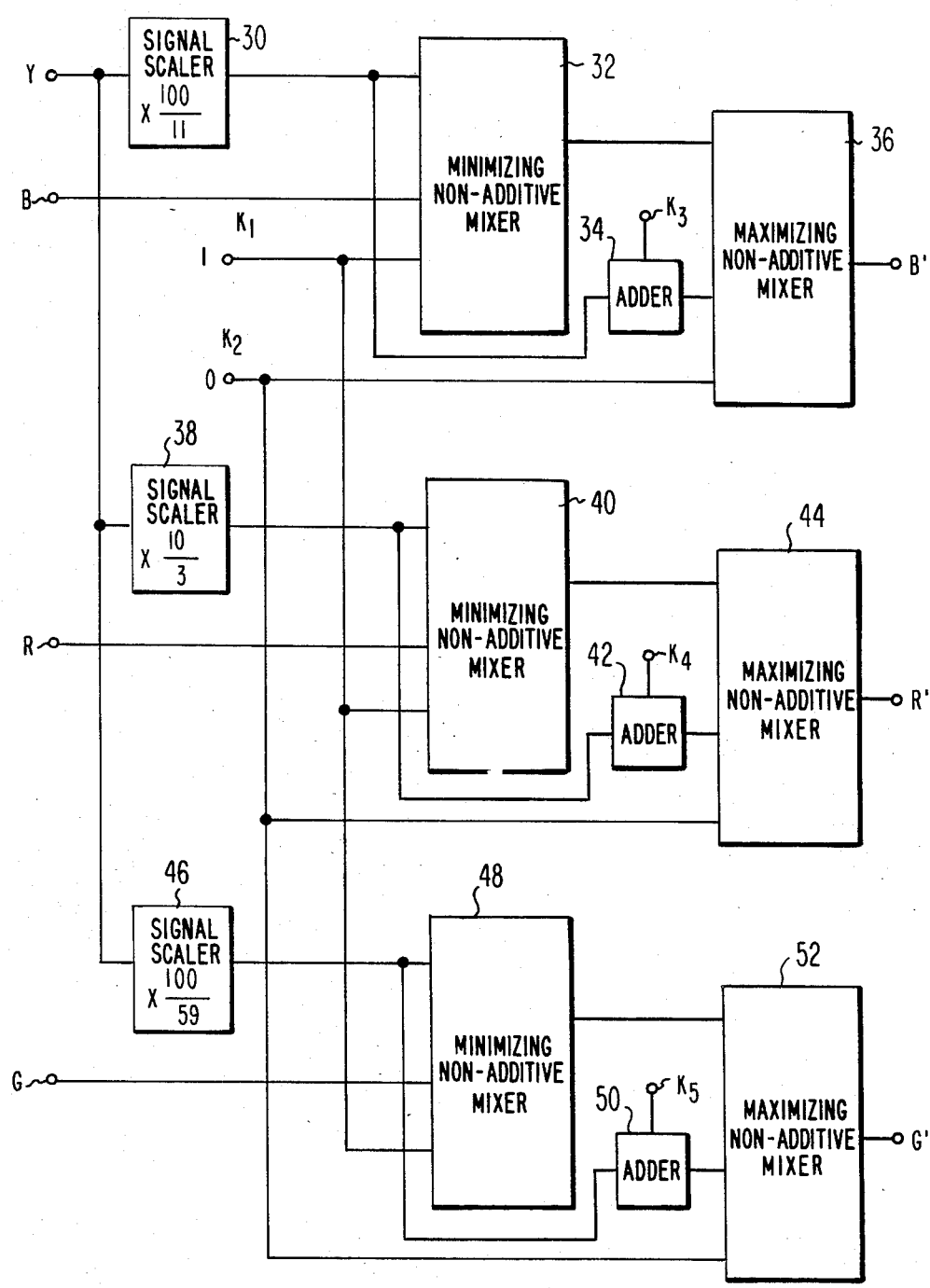
FIG. 6 shows an embodiment of the invention that corrects the three primary color signals, blue, red and green.

FIG. 6 shows an illustrative embodiment of the invention for corrrecting all three primary color signals. Properly delayed luminance signals from, for example, the luminance signal processing circuits of an NTSC color television teceiver are applied to terminal Y which serves as a common input terminal to signal scalers 30, 38 and 46. The output of signal scaler 30 is the luminance signal scaled up by a factor of 100/11. This signal is applied to one input of adder 34 and, as a limiting signal, to an input of minimizing non-additive mixer 32. The other limiting signal input to mixer 32 is a constant signal, from, for example, a source of reference potential of +1 amplitude unit, applied at mixer input terminal $K_1$. $K_1$ also serves an input terminal for minimizing non-additive mixers 40 and 48. The third input to mixer 32 is the blue primary color signal from, for example, the RGB matrix of an NTSC color television receiver. Mixer 32 combines the signals at its three inputs to form an output signal that, at each point in time, has an amplitude value substantially equal to the least of the amplitude values of its input signals. The output signal produced by mixer 32 is a corrected blue primary color signal; its largest amplitude values are within the limits allowed by the coincident luminance signal and by the aforementioned luminance equation.

This output signal is applied as one input to maximizing non-additive mixer 36. The limiting signal inputs to mixer 36 come from the mixer's input terminal $K_2$ and from the output of adder 34. Terminal $K_2$, which also serves as an input terminal to maximizing non-additive mixers 44 and 52 provides a constant signal substantially equal to 0 amplitude units, from, for example, a source of reference potential. The two inputs to adder 34 are the scaled luminance signal from signal scaler 30 and a constant signal substantially equal to $-89/11$ amplitude units, from, for example, a source of reference potential coupled to input terminal $K_3$ of adder 34. The sum of these two signals, the output signal of adder 34, is a limiting input signal to mixer 36. The two limiting signals are combined in mixer 36, with the corrected blue signal from mixer 32 to form an output signal that, at each point in time, has an amplitude value substantially equal to the greatest of the three signals.

The apparatus to correct the other two primary color signals is similar to the apparatus just described. Signal scaler 38, which also receives its input signal via terminal Y, produces a luminance signal scaled up by a factor of 10/3 as an output. This output signal is an input to adder 42 and the first limiting input signal to mixer 40. The other inputs to mixer 40 are the constant limiting signal from terminal $K_1$ and a red primary color signal applied to input terminal R of mixer 40. The output of mixer 40 is applied as an input to mixer 44. The two limiting inputs to mixer 44 are the constant signal from terminal $K_2$ and the output of adder 42. The two inputs to adder 42 are the output of signal scaler 38 and a constant signal substantially equal to $-7/3$ amplitude units applied to input terminal $K_4$ of adder 42. The signal produced by mixer 44 at output terminal R' is a corrected red primary color signal.

The first limiting signal for the green primary color correcting stage appears at the output of signal scaler 46. Luminance signals from input terminal Y are increased in amplitude by a factor of 100/59 by this signal scaler. This output signal is one input of the signals applied to adder 50 and the first limiting input signal applied to mixer 48, the constant signal from terminal $K_1$ being the other limiting input signal. The green primary signal, applied to input terminal G of mixer 48, is the last input signal. The output of mixer 48 is applied as one input to mixer 52. The two limiting signal inputs to mixer 52 are the output signal from adder 50 and the constant signal from terminal $K_2$. The two input signals to adder 50 are the output of signal scaler 46 and a constant signal substantially equal to $-41/59$ amplitude units applied to input terminal $K_5$ of adder 50. The output of mixer 52 is a corrected green primary color signal appearing at the mixer's output terminal G'.

Each of the illustrative embodiments described so far is a combination of four types of devices: signal scalers, adders, minimizing non-additive mixers and maximimizing non-additive mixers. As any of the illustrative embodiments can be realized in an analog or a digital form each of these devices has both an analog and a digital manifestation.

An analog signal scaler is simply an amplifier with a fixed gain while a digital signal scaler is a multiplier; both of these devices are well known in the art. As they are used in the present invention, the analog amplifiers can be designed with low tolerance components and digital multipliers can be designed to use a simplified shift and add technique, as in U.S. Pat. No. 4,343,017, Wilkinson, since small errors in the corrected signal should not noticeably degrade the reproduced image. Both analog and digital adders are also well known and need not be discussed further. Non-additive mixers, however, although known in the art, are usually found in only one form: the maximizing non-additive mixer. The following is an explanation of illustrative analog and digital implementations of both types of non-additive mixer.

Figure 9A:
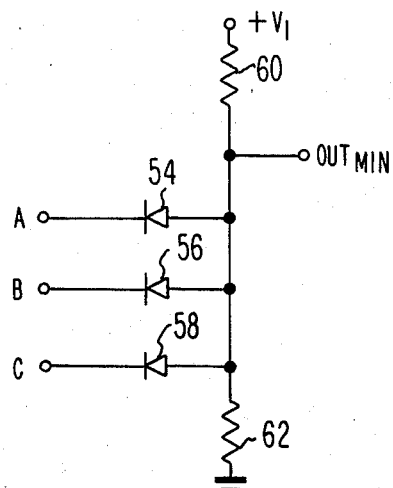
FIGS. 9A, 9B, 9C and 9D are illustrative implementations of component parts used in the embodiments of the invention shown in FIGS. 1, 3, 5 and 6.

FIG. 9A shows an example of a minimizing non-additive mixer that could be used as component part of the present invention. Three signal ports, A, B and C, provide the inputs to the mixer, being connected to the cathodes of diodes 54, 56 and 58, respectively. The interconnected anodes of these three diodes are coupled to the positive terminal ($+V_1$) of an operating potential supply through resistor 60, the negative terminal of said supply being connected to a point of reference potential (e.g. ground). The interconnected anodes are also coupled to output terminal OUT$_{MIN}$ and to ground through resistor 62.

The value of the operating potential and the values of the resistors are chosen so that, with input terminals A, B and C all open, the potential appearing between terminal OUT$_{MIN}$ and ground is greater than the largest expected input signal value. Any signal applied to an input terminal that is less than this value will forward bias its associated diode causing the output potential to fall until it is approximately equal to the applied signal. Furthermore, when a signal with a still lower amplitude value is applied to a second input, this signal will pull the output potential lower, effectively reverse biasing the diode associated with the first signal. As the output signal of this device has a value at each point in time approximately equal to the amplitude of the lowest input signal, this circuit is a minimizing non-additive mixer.

Figure 9B:
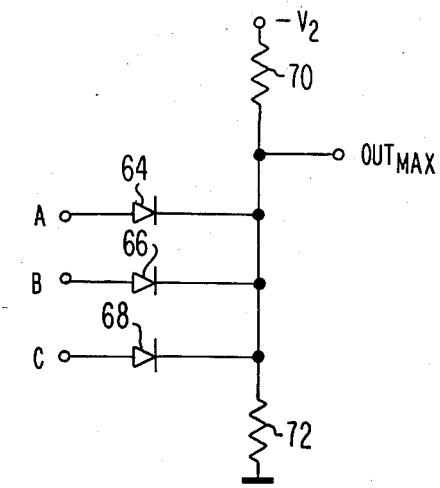

FIG. 9B shows the analogous embodiment of a maximizing non-additive mixer. In this circuit, the input terminals A, B and C are coupled to the anodes of diodes 64, 66 and 68, respectively. The interconnected cathodes of these diodes are connected to output terminal OUT$_{MAX}$, to ground through resistor 72, and through resistor 70, to the negative terminal ($-V_2$) of a second operating potential supply, the positive terminal of said second operating potential supply being connected to ground.

The value of the supply and the values of the resistors for this non-additive mixer should be chosen so that the potential between terminal OUT$_{MAX}$ and ground when terminals A, B and C are disconnected is lower than the lowest expected value of any of the input signals. When a signal with a larger amplitude value is applied to any of the input terminals, it forward biases its associated diode, pulling up the output potential to be approximately equal to the applied input signal. Furthermore, when a signal with a still larger amplitude value is applied to a second input, this signal will pull the output potential higher, effectively reverse biasing the diode associated with the first signal. As the output of this device has a value at each point in time approximately equal to the value of the highest input signal, this circuit is a maximizing non-additive mixer.

Figure 9C:
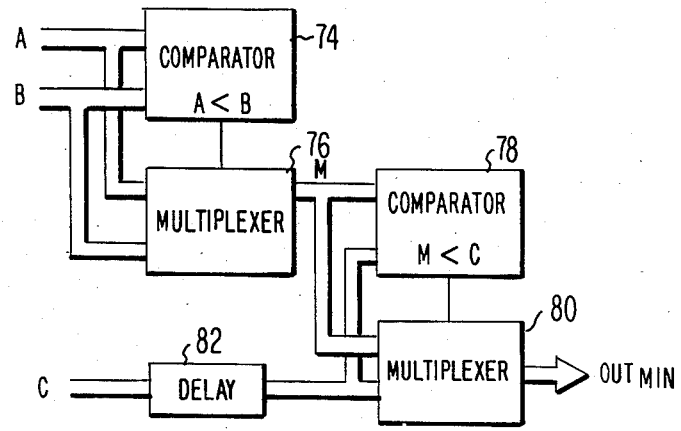

FIG. 9C shows the digital implementation of a minimizing non-additive mixer. Digitally encoded signals are applied to input ports A, B and C. Ports A and B are each connected to both comparator 74 and to multiplexer 76, port C provides the input signal to delay element 82. The output of comparator 74 is connected to multiplexer 76 as a control input. The output of multiplexer 76 appears at port M and provides a data input to both comparator 78 and multiplexer 80. The data signal appearing at the output port of delay element 82 is also connected as an input to both comparator 78 and multiplexer 80. The output of comparator 78 is connected to the control input of multiplexer 80. The minimizing non-additive mixer's output signal appears at port OUT$_{MIN}$ of multiplexer 80.

The embodiment of a three input mixer shown in FIG. 9C is actually a pair of two input minimizing non-additive mixers coupled in cascade. The first mixer comprising comparator 74 and multiplexer 76 produces an output signal at port M that is equal to the lesser of the two input signals, A or B, at any point in time. Comparator 78 and multiplexer 80 form the second stage. This mixer finds the minimum of the signal appearing at output port M and the delayed C signal from delay element 82. The output of multiplexer 80, then, is a signal which has values equal to the minimum values of the input signals applied to ports A, B and C.

Each of the component two input mixers perform the same function, providing an output equal to the lesser of its inputs. The comparator of each mixer generates a control output signal that has a value of "1" when the signal at one of its inputs is less than the signal at its other input and a value of "0" otherwise. This signal is applied to the control input of the multiplexer. The multiplexer passes one of its input data signals to its output port if the signal on the control line is "1" and the other input data signal if the control line is "0". Delay element 82 is in the mixer to delay the data signal applied to port C an amount of time equal to the time spent finding the smaller of the signals applied to ports A and B.

Figure 9D:
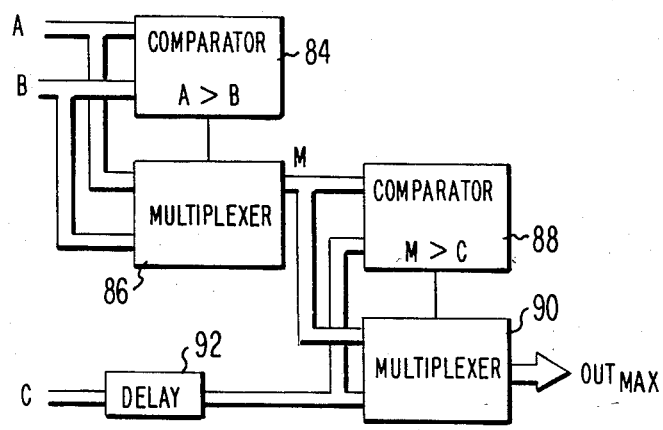

The digital maximizing non-additive mixer in FIG. 9D is similar in structure and function to the minimizing non-additive mixer of FIG. 9C. Input signals are applied to ports A and B, which provide the data inputs to comparator 84 and multiplexer 86, and to port C which provides the data input to delay element 92. The output of comparator 84 is a control input to multiplexer 86. The output of multiplexer 86 is one of the data inputs to comparator 88 and multiplexer 90, the other data input being the delayed signal from port C through delay element 92. The control input of multiplexer 90 is provided by the output of comparator 88. The output of multiplexer 90 is the output of the mixer.

The described digital maximizing mixer functions identically to the minimizing mixer shown in 9C with only one exception: the comparators of the component two input maximizing mixers produce a "1" on their output control lines when one signal is greater than the other and a "0" otherwise—the opposite of the comparators in the minimizing mixer.

Figure 10:
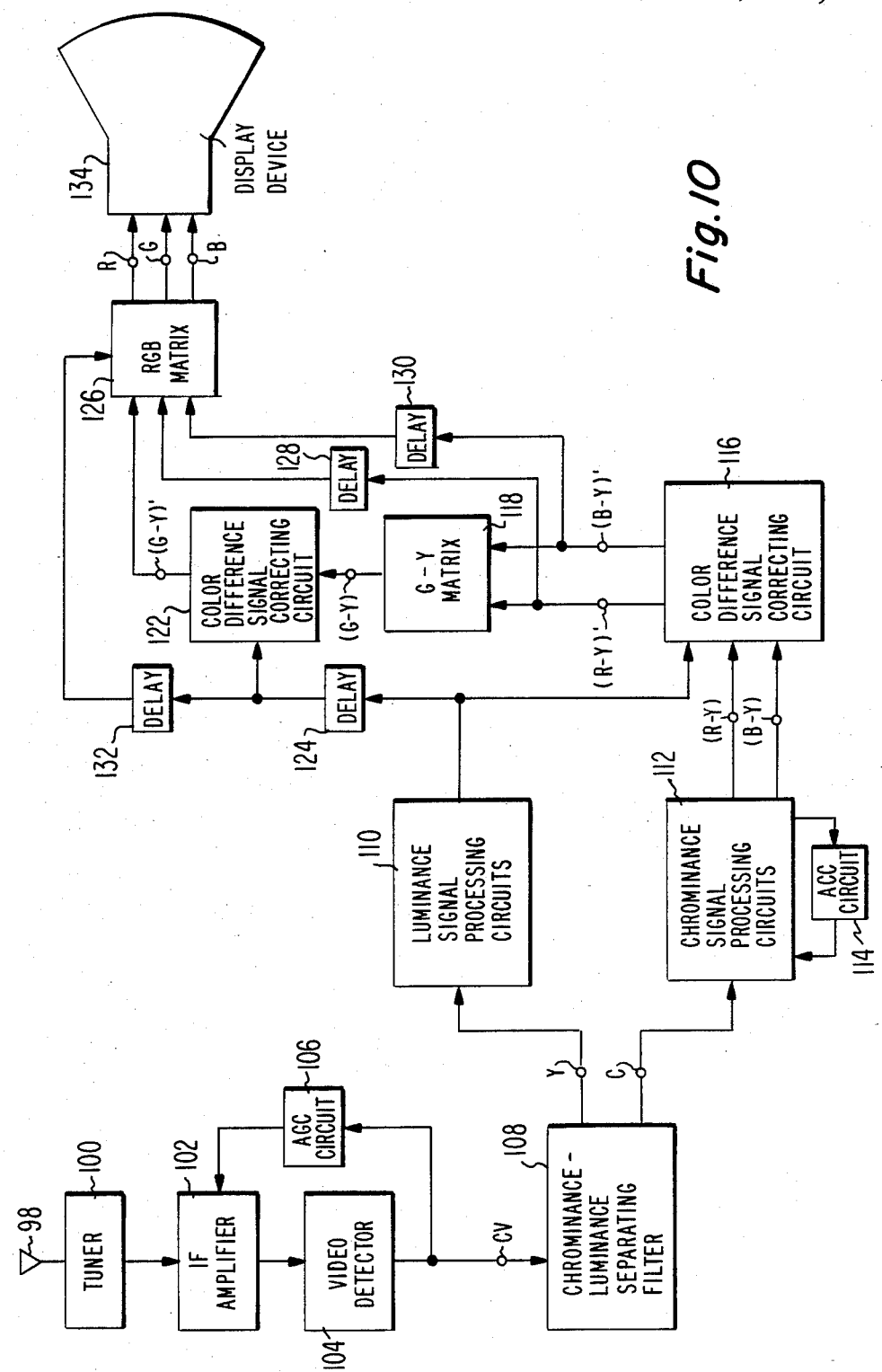
FIG. 10 shows an embodiment of the present invention in the context of a color television receiver.

The final figure, FIG. 10, shows two levels of color difference signal correcting networks used advantageously in cascade in the NTSC color television receiver. Broadcast color television signals are received by antenna 98 and supplied to tuner 100 which converts the received television signals into an intermediate frequency signal. One input of IF amplifier 102 is coupled to the output of tuner 100. The output of IF amplifier 102 is coupled to the input of video detector 104. The output of video detector 104 is connected to the input of AGC circuit 106 and to terminal CV. A second input to IF amplifier 102 is provided by the output of AGC circuit 106.

The IF amplifier amplifies the intermediate frequency signal developed by the tuner. The gain of the IF amplifier is variable and controlled by a signal from the AGC. This well known circuit operates to produce a demodulated composite video signal with relatively constant minimum and maximum amplitude values at terminal CV.

The composite video signal at terminal CV is the input signal to the chrominance-luminance separating filter 108. This device separates the wide bandwidth luminance signal component and the narrow bandwidth chrominance signal components from the composite video signal. The luminance and chrominance signals appear at the separating filter's output terminals Y and C, respectively. Luminance signals at terminal Y are passed to luminance signal processing circuits 110 which develop a fully processed luminance signal. The chrominance signal at terminal C is passed to chrominance signal processing circuits 112 where it is amplified and demodulated into component R-Y and B-Y color difference signals. These appear at the chrominance signal processing circuits' output terminals (R-Y) and (B-Y) respectively.

The amount by which the chrominance signal is amplified in this processing step is controlled by ACC circuit 114. The ACC circuit monitors the amplitude of the color burst component of the chrominance signal to stabilize the minimum and maximum amplitude values of the chrominance signal. This is done by varying the amount of amplification performed by the chrominance signal processing circuits in response to variations, for example, in the amplitude of the color burst component.

As a result of the signal range stabilization performed by AGC 104 and ACC 114, the two color difference signals appearing at the output of the chrominance signal processing circuits 112 and the luminance signal appearing at the output of luminance signal processing circuits 110 have relatively constant and predictable minimum and maximum amplitude values. This predictability is desirable to simplify implementation of apparatus in accordance with the present invention.

The luminance signal, developed by luminance signal processing circuits 110 and the R-Y and B-Y color difference signals developed by chrominance signal processing circuits 112 are applied to color difference signal correcting circuit 116 which develops corrected R-Y and B-Y color difference signals, by means consistant with the present invention, at its output terminals (R-Y)' and (B-Y)' respectively. Color difference correcting circuit 116 comprises two stages: an R-Y stage similar to the one in FIG. 5 formed by signal scalers 10 and 14, adder 16, minimizing non-additive mixer 12, adder 18 and maximizing non-additive mixer 20; and a B-Y stage similar to the one shown in FIG. 5 formed by signal scalers 2 and 14, adder 16, minimizing non-additive mixer 4, adder 6 and maximizing non-additive mixer 8.

The corrected R-Y and B-Y signals from terminals (R-Y)' and (B-Y)' are applied as inputs to a standard G-Y matrix 118 which develops a G-Y color difference signal at its (G-Y) output terminal. This color difference signal is corrected according to the principles of this invention by color difference correcting circuit 122.

The signal at terminal (G-Y) is one input to circuit 122 and the luminance signal from the output of delay 124 is the other. The input to delay 124 is the luminance signal at the output of luminance processing circuits 110.

The output of color difference correcting circuit 122, appearing at the circuit's output terminal (G-Y)', is a G-Y color difference signal corrected in accordance with to the principles of the present invention. This signal is applied to one input of a standard RGB matrix 126. The other three inputs to matrix 126 are the R-Y color difference signal from terminal (R-Y)' as delayed by delay 128, the B-Y color difference signal from terminal (B-Y)' as delayed by delay 130, and the luminance signal from the output of delay 124 as delayed by delay 132. The outputs of matrix 126 are red, green and blue primary color signals appearing at the matrix output terminals R, G and B, respectively. These primary color signals are applied to display device 134 to reproduce a corrected color image.

As stated above, the use of two color difference signal processing circuits in cascade results in a more fully corrected image than would be produced by an apparatus, such as that shown in FIG. 5, that corrects the three color difference signals in parallel. The greater degree of correction is seen only in the green component of displayed images, however, and is a second order manifestation of the corrections performed on the R-Y and B-Y signals that were used to develop the G-Y signals.

What is claimed is:

1. In a color television receiver for processing composite color video signals inclusive of a wide bandwidth luminance signal component and a relatively narrow bandwidth chrominance signal component, said color television receiver including: chrominance signal processing means responsive to said chrominance signal component for developing a plurality of color information signals of color difference signal form, each of lesser bandwidth than said wide bandwidth luminance signal; a matrix having a plurality of color difference signal input terminals for algebraically combining said wide bandwidth luminance signal with respective color difference signals appearing at said plurality of color difference signal input terminals to form a set of color information signals or primary color signal form; an image reproducing means having a plurality of primary color signal input terminals for reproducing a color image in response to respective color information signals of primary color signal form appearing at said plurality of primary color signal input terminals; apparatus for correcting the color information signal input to one of said signal input terminals, said correcting apparatus comprising:

means responsive to said wide bandwidth luminance signal for providing a wide bandwidth color limit signal proportional to said luminance signal;

signal combining means accepting a color information signal and said color limit signal as input signals and providing an output signal which has instantaneous amplitude values proportional to the least of the instantaneous amplitude values of its input signals; and means for utilizing said output signal to form a corrected color information signal for delivery to said one signal input terminal.

2. Apparatus in accordance with claim 1 wherein the color information signal accepted as an input signal by said signal combining means comprises a color difference signal developed by said chrominance signal processing means; and wherein said one signal input terminal is one of said plurality of primary color difference signal input terminals of said matrix.

3. Apparatus in accordance with claim 1 wherein the color information signal accepted as an input signal by said signal combining means comprises a primary color signal formed by said matrix circuit; and wherein said one signal input terminal is one of said plurality of primary color signal input terminals of said image reproducing means.

4. In a color television receiver for processing composite color video signals inclusive of a wide bandwidth luminance signal component and a relatively narrow bandwidth chrominance signal component, said color television receiver including: chrominance signal processing means responsive to said chrominance signal component for developing a plurality of color information signals of color difference signal form, each of lesser bandwidth than said wide bandwidth luminance signal; a matrix having a plurality of color difference signal input terminals for algebraically combining said wide bandwidth luminance signal with respective color difference signals appearing at said plurality of color difference signal input terminals to form a set of color information signals of primary color signal form; an image reproducing means having a plurality of primary color signal input terminals for reproducing a color image in response to respective color information signals of primary color signal form appearing at said plurality of primary color signal input terminals; apparatus for correcting the color information signal input to one of said signal input terminals, said correcting apparatus comprising:

a first signal processing apparatus including:

(1) means responsive to said wide bandwidth luminance signal for providing a first wide bandwidth color limit signal proportional to said luminance signal; and (2) a first signal combining means accepting a color information signal and said first color limit signal as input signals and providing an output signal which has instantaneous amplitude values proportional to the least of the instantaneous amplitude values of its input signals;

and a second signal processing apparatus including:

(1) means responsive to said wide bandwidth luminance signal for providing a second wide bandwidth color limit signal proportional to said luminance signal; and (2) a second signal combining means accepting a color information signal and said second color limit signal as input signals and providing an output signal which has instantaneous amplitude values proportional to the greatest of the amplitude values of its input signals;

wherein said first and second signal processing apparatus are coupled in cascade to form a corrected color information signal for delivery to said one signal input terminal.

5. Apparatus in accordance with claim 4 further including:

a signal inverter responsive to said wide bandwidth luminance signal for providing an inverted version of said luminance signal;

means responsive to said inverted version of said wide bandwidth signal for providing a third wide bandwidth color limit signal proportional to said inverted version of said luminance signal, said third color limit signal being applied as an additional input signal to said first signal combining means.

6. Apparatus in accordance with claim 5 further including:

means responsive to said inverted version of said wide bandwidth luminance signal for providing a fourth wide bandwidth color limit signal proportional to said inverted version of said luminance signal, said fourth color limit signal being applied as an additional input signal to said second signal combining means.

7. Apparatus in accordance with claim 6 wherein said color information signal accepted as an input by one of said signal combining means comprises a color difference signal developed by said chrominance signal processing means; wherein said color information signal accepted as an input by the other of said signal combining means comprises a corrected color difference signal developed by said one signal combining means, and wherein said one signal input terminal is one of said plurality of color difference signal input terminals of said matrix.

8. Apparatus in accordance with claim 4 further including:
a first constant signal source for providing a third color limit signal; said third color limit signal being applied as an additional input signal to said first signal combining means.

9. Apparatus in accordance with claim 8 further including:
a second constant signal source for providing a fourth color limit signal; said fourth color limit signal being applied as an additional input signal to said second signal combining means.

10. Apparatus in accordance with claim 9 wherein said color information signal accepted as input by one of said signal combining means comprises a primary color signal developed by said matrix; wherein said color information signal accepted as an input by the other of said signal combining means comprises a corrected primary color signal developed by said one signal combining means, and wherein said one signal input terminal is one of said plurality of color difference signal input terminals of said matrix.

11. In a color television receiver for processing composite video signals inclusive of a wide bandwidth luminance signal component and a relatively narrow bandwidth chrominance signal component, said color television receiver including: chrominance signal processing means responsive to said chrominance signal component for developing a plurality of color difference signals, each of lesser bandwidth than said wide bandwidth luminance signal, a matrix having a plurality of color difference signal input terminals for algebraically combining said wide bandwidth luminance signal with respective color difference signals appearing at said plurality of color difference signal input terminals to form a set of primary color signals; an image reproducing means having a plurality of primary color signal input terminals for reproducing a color image in response to respective color information signals of primary color signal form appearing at said plurality of primary color signal input terminals; apparatus for forming corrected color difference signals comprising a plurality of color difference signal processing means, each responsive to a different one of said color difference signals developed by said chrominance signal processing means, each of said color difference signal processing means comprising:
means responsive to said wide bandwidth luminance signal for providing a first wide bandwidth color difference limiting signal proportional to said luminance signal;
a signal inverter responsive to said wide bandwidth luminance signal for providing an inverted version of said luminance signal;
means responsive to said inverted version of said wide bandwidth luminance signal for providing a second wide bandwidth color difference limiting signal proportional to said inverted version of said luminance signal;
a first signal combining means responsive to a narrow bandwidth color difference signal and to said first and second wide bandwidth color difference limiting signals for providing an output signal which has instantaneous amplitude values proportional to the least of the instantaneous amplitude values of its input signals;
means responsive to said wide bandwidth luminance signal for providing a third wide bandwidth color difference limiting signal proportional to said luminance signal;
means responsive to said inverted version of said wide bandwidth luminance signal for providing a fourth wide bandwidth color difference limiting signal proportional to said inverted version of said luminance signal;
a second signal combining means responsive to said output signal of said first signal combining means and to said third and fourth wide bandwidth color difference limiting signals for providing an output signal which has instantaneous amplitude values proportional to the greatest of the instantaneous amplitude values of its input signals;
said output signal of said second signal combining means being a corrected version of a color difference signal and being the output signal of said color difference signal processing means;
the outputs of said plurality of color difference signal processing means being coupled to said plurality of color difference signal input terminals of said matrix for providing said matrix with a plurality of corrected color difference signals.

12. Apparatus in accordance with claim 11 wherein said plurality of color difference signals comprises an R-Y color difference signal and a B-Y color difference signal to the exclusion of a G-Y color difference signal.

13. Apparatus in accordance with claim 12 further including: a matrix responsive to said R-Y and B-Y color difference signals for developing a G-Y color difference signal; and apparatus for forming a corrected G-Y color difference signal comprising color difference signal processing means comprising:
means responsive to said wide bandwidth luminance signal for providing a first G-Y color difference limiting signal proportional to said luminance signal;
a signal inverter responsive to said wide bandwidth luminance signal for providing an inverted version of said luminance signal;
means responsive to said inverted version of said width bandwidth luminance signal for providing a second wide bandwidth color difference limiting signal proportional to said inverted version of said luminance signal;
a third signal combining means responsive to said G-Y color difference signal and to said first and second G-Y color difference limiting signals for providing an output signal which has instantaneous amplitude values proportional to the least of the instantaneous amplitude values of its input signals;
means responsive to said wide bandwidth luminance signal for providing a third G-Y color difference limiting signal proportional to said luminance signal;
means responsive to said inverted version of said wide bandwidth luminance signal for providing a fourth wide bandwidth color difference limiting signal proportional to said inverted version of said luminance signal;
a fourth signal combining means responsive to said output signal of said third signal combining means and to said third and fourth G-Y color difference limiting signals for providing an output signal which has instantaneous amplitude values proportional to the greatest of the instantaneous amplitude values of its input signals;

said output signal of said fourth signal combining means being a corrected version of said G-Y color difference signal and being the output signal of said one color difference signal processing means;

the output of said color difference signal processing means being coupled to said G-Y color difference signal input terminal of said matrix for providing said matrix with a corrected G-Y color difference signal.

14. In a color television receiver for processing composite video signals inclusive of a wide bandwidth luminance signal component and a relatively narrow bandwidth chrominance signal component, said color television receiver including: chrominance signal processing means responsive to said chrominance signal component for developing a plurality of color difference signals, each of lesser bandwidth than said wide bandwidth luminance signal; a matrix responsive to said plurality of color difference signals and to said luminance signal to form a set of primary color signals through algebraic combination of said color difference signals and said luminance signal; an image reproducing means having a plurality of primary color signal input terminals for reproducing a color image in response to respective primary color signals appearing at said plurality of primary color signal input terminals; apparatus for forming corrected primary color signals comprising a plurality of primary color signal processing means, each responsive to a different one of said primary color signals developed by said matrix, each of said primary color signal processing means comprising:

means responsive to said wide bandwidth luminance signal for providing a first primary color limiting signal proportional to said luminance signal;

a constant signal source for providing a second primary color limiting signal;

a first signal combining means responsive to a primary color signal and to said first and second primary color limiting signals for providing an output signal which has instantaneous amplitude values proportional to the least of the instantaneous amplitude values of its input signals;

means responsive to said wide bandwidth luminance signal for providing a third primary color limiting signal proportional to said luminance signal;

a constant signal source for providing a fourth primary color limiting signal;

a second signal combining means responsive to said output signal of said third signal combining means and to said third and fourth primary color limiting signals for providing an output signal which has instantaneous amplitude values proportional to the greatest of the instantaneous amplitude values of its input signals;

said output signal of said fourth signal combining means being a corrected version of a primary color signal and being the output signal of said primary color signal processing means;

the outputs of said plurality of primary color signal processing means being coupled to said plurality of primary color signal input terminals of said image reproducing means for providing said image reproducing means with a plurality of corrected primary color signals.

* * * * *